United States Patent

Nakashima

[11] 4,185,266
[45] Jan. 22, 1980

[54] DISPLAY APPARATUS FOR MOTOR VEHICLE

[75] Inventor: Noriyuki Nakashima, Nagoya, Japan

[73] Assignees: Nippondenso Co., Ltd., Kariya; Sharp Corporation, Osaka, both of Japan

[21] Appl. No.: 800,951

[22] Filed: May 26, 1977

[30] Foreign Application Priority Data

Jun. 28, 1976 [JP] Japan .................. 51-76667

[51] Int. Cl.² .............. B60Q 1/00; G02F 1/26; G11C 11/22
[52] U.S. Cl. ............... 340/52 F; 340/52 R; 340/366 B; 340/763; 350/150
[58] Field of Search ............ 340/52 R, 52 F, 324 R, 340/366 B, 763; 350/150

[56] References Cited

U.S. PATENT DOCUMENTS

| 3,609,002 | 9/1971  | Frazer et al.   | 350/150   |
| 3,626,367 | 12/1971 | Howard et al.   | 340/52 F  |
| 3,666,666 | 5/1972  | Haertling       | 252/62.9  |
| 3,701,121 | 10/1972 | Fraser          | 340/173.2 |
| 3,702,724 | 11/1972 | Land et al.     | 350/160   |
| 3,882,490 | 5/1975  | Tashiro et al.  | 340/366 B |
| 3,973,247 | 8/1976  | Kumada et al.   | 340/173.2 |
| 3,990,770 | 11/1976 | Carl et al.     | 350/150   |

*Primary Examiner*—John W. Caldwell, Sr.
*Assistant Examiner*—Joseph E. Nowicki
*Attorney, Agent, or Firm*—Cushman, Darby & Cushman

[57] ABSTRACT

A display apparatus for a motor vehicle or the like in which a detected signal from a sensor is converted into a voltage by a control unit. The converted voltage is applied to an electro-optical ceramic so that a hue of light transmitted through the ceramic is changed in accordance with the voltage applied to the ceramic to effect hue display.

6 Claims, 7 Drawing Figures

DISPLAY APPARATUS FOR MOTOR VEHICLE

BACKGROUND OF THE INVENTION

The present invention relates to a display apparatus for a motor vehicle for displaying various variables by the change of hue of electro-optical ceramics.

In a prior art display apparatus for displaying variables in the motor vehicle, the velocity of the motor vehicle, the amount of fuel in a fuel tank and the temperature of cooling water, green and red lamps are used as colored indicators for the detected variable and the output from the sensor is converted into a voltage such that the green lamp is lit when the output of the sensor is below a predetermined level while the red lamp is lit when the output is above the predetermined level. Since the prior art apparatus uses the lamps as the indication elements, at least two lamps of different color such as green and red must be used to effect color display, and a complex circuit is required to hold the contents of display.

SUMMARY OF THE INVENTION

It is an object of the present invention to provide a display apparatus for a motor vehicle which overcomes the above drawbacks of the prior art apparatus and wherein an electro-optical ceramic is used as the display element to which a light from a light source is directed and a voltage applied to a plurality of electrodes arranged on the ceramic is controlled in accordance with at least one of variables in the motor vehicle to change an electric field strength in the ceramic so that color of light transmitted through the ceramic is changed in accordance with the variable to effect hue display.

According to the present invention, hue display can be effected in accordance with the change in a predetermined item, and a hue state at a last moment, preferably at a time just before the turn-off of power supply can be stored for identification. Furthermore, no power is consumed for storage and a power required for display is very small.

DESCRIPTION OF THE PREFERRED EMBODIMENTS

Figure 1:
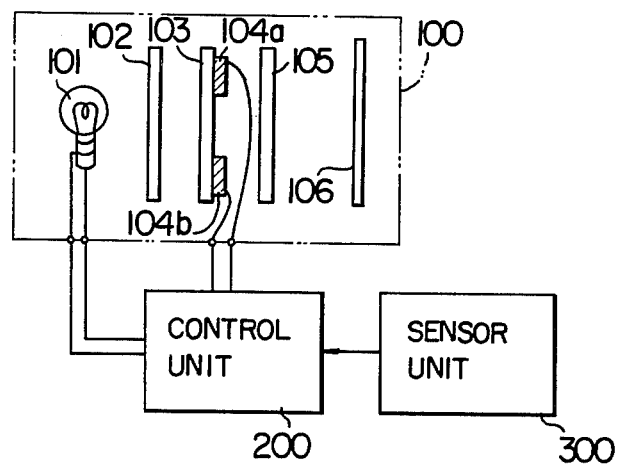
FIG. 1 shows a construction of a first embodiment of a display apparatus for a motor vehicle in accordance with the present invention.

The present invention is now described in conjunction with the preferred embodiments shown in the accompanying drawings. An overall configuration of the present invention is shown in FIG. 1. In FIG. 1, numeral 100 denotes a display unit disposed near a occupant seat to present a visual indication to a driver, in which numeral 101 denotes a lamp as a light source, 102 denotes a polarizer plate receiving a light from the light source 101 for transmitting an oscillating wave in a predetermined direction, 103 denotes an electro-optical element called a PLZT ceramic, 104a and 104b denote electrode members attached in predetermined patterns on surfaces of the thin plate PLZT ceramic, 105 denotes an analyzer plate receiving the light transmitted through the ceramic 103 and having a polarizing plane oriented to differ from that of the polarizer plate 102 by 90 degrees, and 106 denotes a screen for receiving the light transmitted through the analyzer plate 105. The screen 106 may be omitted so that a viewer directly views a surface of the analyzer plate 105. Numeral 200 denotes a control unit for electrically controlling the drive of the display unit 100, and numeral 300 denotes a sensor unit which detects the status of respective items of a motor vehicle and converts the detected signal to an analog or digital electrical signal. For example, it produces an analog output voltage indicative of the velocity or acceleration of the motor vehicle, amount of fuel in a fuel tank, the temperature of an engine, the temperature of cooling water or the temperature of a catalyst, or it produces a digital binary signal of the amount of engine oil or brake oil, the amount of wear of a brake lining or the oil pressure of the brake oil depending on whether it is within a predetermined warning level or not. The control unit 200 responds to an output of the sensor unit 300 to produce a proportional voltage signal, preferably a step function voltage signal, for sequentially changing an electric field strength applied to the ceramic 103 so that a sequentially changing hue, preferably only clear hue such as red, orange, yellow, . . . blue is displayed on the screen 106.

A display system using the PLZT ceramic based on the above construction is now explained. When the operator turns on a power supply, the lamp 101 is lit and the light is directed to the polarizer plate 102, which transmits the vibration wave of the predetermined direction (linear polarizer light) and applies it to the PLZT ceramic 103. When no voltage is being applied between the electrodes 104a and 104b on the ceramic 103, the ceramic 103 does not exhibit an optical unisotropy so that the vibration wave is passed as it is to the analyzer plate 105. However, since the polarization plane of the analyzer plate 105 is oriented to differ from that of the polarizer plate 102 by 90 degrees, the incident light to the analyzer plate 105 is not transmitted but interrupted so that no light reaches the screen 106. On the other hand, when a given voltage is applied between the electrodes 104a and 104b, the linear polarized light transmitted through the polarizer plate 102 from the lamp 101 is double refracted to produce ideally an eliptical polarized light so that only the vibration wave of a predetermined direction and of a given wavelength is transmitted through the analyzer 105. If the given wavelength corresponds to red, the screen 106 turns red. By designing the control unit 200 such that it produces an output voltage, preferably a step function voltage, which is proportional to the output level of the sensor 300, a hue which changes in accordance with the status of the sensor in the sensor unit 300 can be displayed.

Thus, by taking out the sensor signal of the sensor unit 300 as a variable voltage signal developed across a variable resistor used in an existing float type device for detecting the amount of fuel in the fuel tank and continuously controlling the voltage applied to the PLZT ceramic 103 in accordance with the output level of the detected voltage signal, the hue display in accordance with the amount of fuel can be effected. This can also be applied to display the velocity of the motor vehicle, the rotational speed of the engine or the temperature of the engine.

Figure 2:
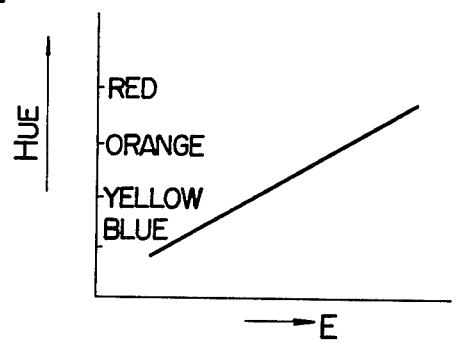
FIGS. 2 and 3 show characteristic curves of an electro-optical ceramic (PLZT ceramic) used in the present apparatus.

Furthermore, by selecting a predetermined composition ratio of composition of the PLZT ceramic, 103, that is, lead Pb, lanthanum La, zirconium Zr and titanium Ti so that the PLZT ceramic 103 exhibits a linear electro-optical effect, it exhibits a hue characteristic proportional to the strength of electric field E as shown in FIG. 2. A hue memory can be provided by electrically or mechanically constructing the PLZT ceramic 103 having the above characteristic such that the electric field in the ceramic 103 is maintained by a capacitor effect of the electrode plates 104a and 104b and the PLZT ceramic 103. In a preferred embodiment, a voltage between the electrodes 104a and 104b appearing just before the turn-off of the power supply is maintained during the turn-off period of the power supply so that any abnormal item can be displayed by lighting the lamp 101 by an auxiliary switch even during parking. It is also possible to display any abnormal item which occurred during previous running of the motor vehicle upon the actuation of a key switch to give warning to the driver so that be may take necessary measures.

Figure 3:
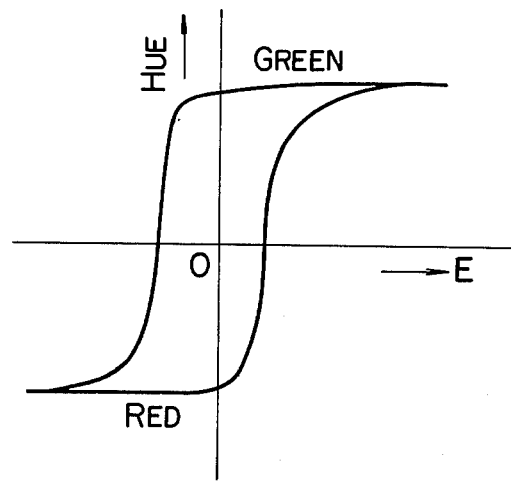

The PLZT ceramic 103 may exhibit a secondary electro-optic memory effect depending on composition ratio and particle size. The PLZT ceramic 103 having this effect exhibits a hysteresis characteristic to the electric field E as shown in FIG. 3 and has a function of memory for hue. In this case, memory function is obtained without maintaining the electric field by the electrical or mechanical device as described above, but an erase device for erasing the memory content may be added as required. The erase device may be conveniently a device for applying a.c. voltage or a device for applying Joule heat.

Figure 4:
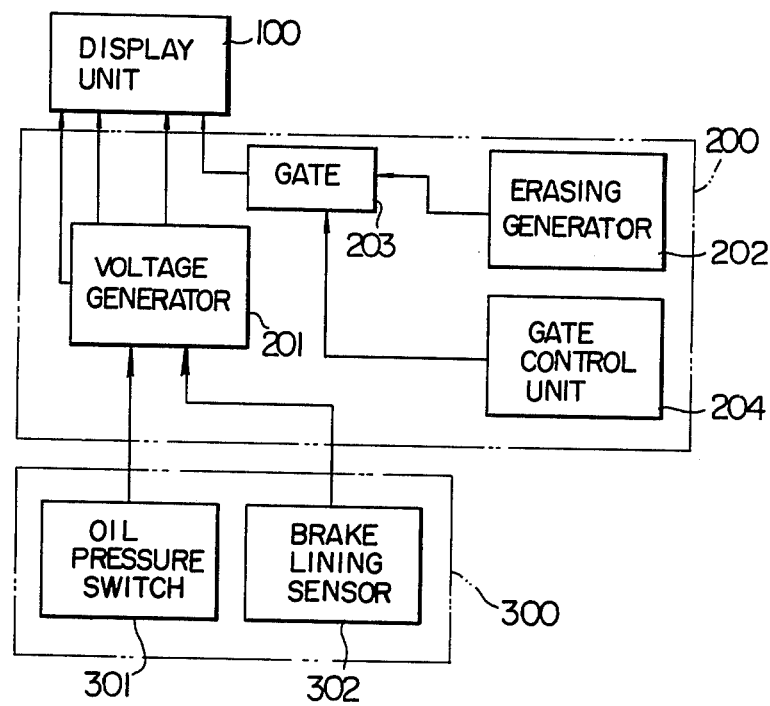
FIG. 4 shows a block diagram of a second embodiment of the present apparatus.

An embodiment which uses the PLZT ceramic having the second electro-optic memory effect is shown in FIG. 4. The memory function may be advantageously used for those items the abnormality of which cannot be detected except after the start of engine or after actual running. For example, in detecting abnormal wear of a brake lining or detecting brake oil pressure by a wire sensor in which the abnormality cannot be detected unless a brake pedal is stepped on after the actuation of a key switch or in detecting oil pressure by an oil pressure switch in which the abnormal of the oil pressure cannot be determined unless the engine is started, the memory function described above is advantageous from the standpoint of safe operation. In FIG. 4, the sensor unit 300 includes an oil pressure switch 301 for detecting the oil pressure and a wire sensor 302 for detecting abnormal wear of the brake lining. In the control unit 200, numeral 201 denotes a voltage generator which receives outputs of binary level from the sensors 301 and 302 and applies a predetermined voltage for displaying a corresponding item in red when abnormality is detected, numeral 202 denotes an erasing generator for generating an a.c. voltage signal for erasing the memory content of the PLZT ceramic, numeral 203 denotes a gate for controlling the transmission of the a.c. signal, and numeral 204 denotes a gate control unit for detecting a necessary time for the memory erase to manually or automatically control the gating state of the gate 203.

With the above arrangement, if the abnormal occurs for a certain item during the run, that item is displayed by color and the hue is memorized. Thus, even during the stop of the engine, the abnormal item can be identified by turning the indication lamp on in response to the actuation of a switch such as an accessory switch. If the circuit is so arranged that the indication lamp is turned on in response to the actuation of the key switch, the abnormal item can be identified when the motor vehicle is again operated. If the gate control unit 204 is manually operated as required, the memory content of the PLZT ceramic, in the display unit 100 can be erased.

Figure 5:
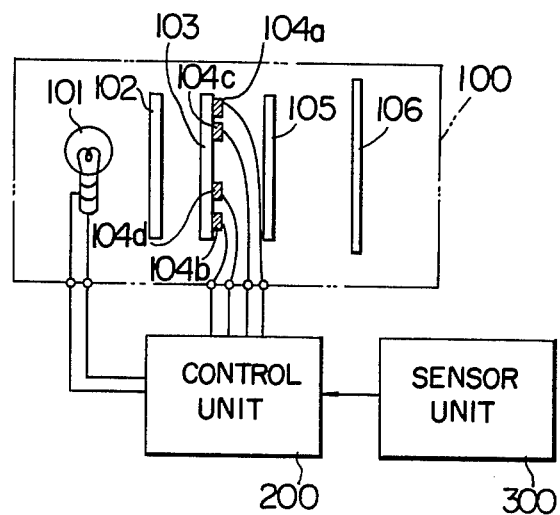
FIGS. 5 and 7 show constructions of a third embodiment of the present invention.
Figure 6:
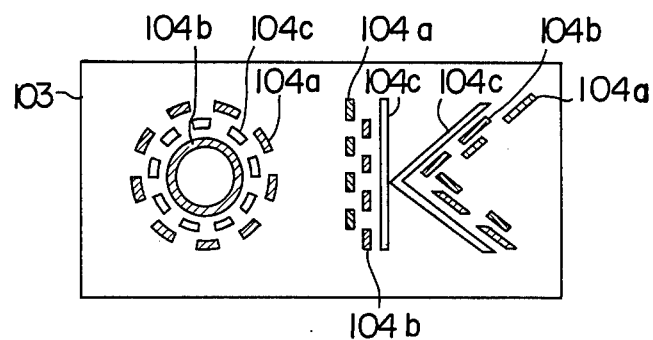
FIG. 6 illustrates the arrangement of electrodes on the PLZT ceramic substrate.
Figure 7:
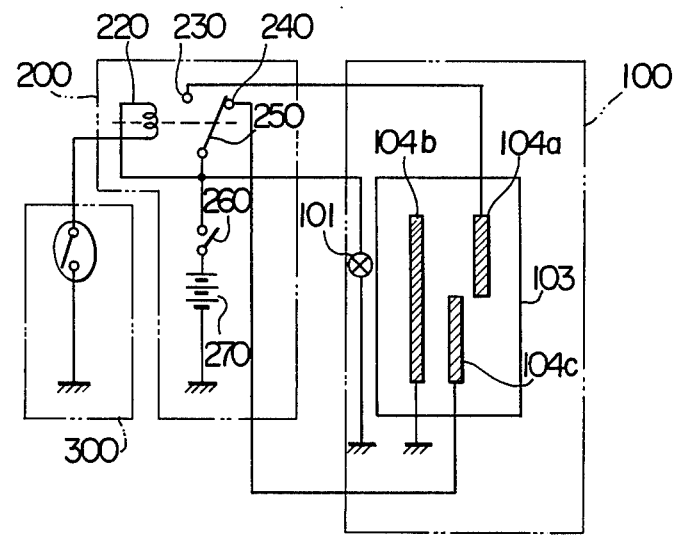

Another embodiment for imparting the electric field change of the PLZT ceramic is shown in FIGS. 5 through 7. A plurality of electrodes for applying voltages to the PLZT ceramic 103 are arranged. A combination of the electrodes 104a, 104b, 104c and 104d to which voltages are to be selectively applied is selected in accordance with a sensor output level of the sensor unit 300. In FIG. 7, for example, respective electrodes 104a, 104b, 104c and 104d are arranged to display "OK" in different colors. Even for a given applied voltage, the electric field strength is changed because an electrode-to-electrode distance is changed. As a result, the hue displaying "OK" can be changed. FIG. 7 shows a simple construction in which the key switch and the battery are represented by 260 and 270, respectively. When a coil 220 is excited by the closure of the sensor 300, a movable contact 250 is moved from a stationary contact 240 to a stationary contact 230. The voltage is applied between the electrodes 104a and 104b during the closure of the sensor 300, whereas it has been applied between the electrodes 104c and 104b during the opening of the sensor 300. As a result, the electric field in the PLZT ceramic 103 is changed, and the hue display is effected to indicate the closure of the sensor 300.

I claim:

1. A display apparatus for a motor vehicle having an engine activation switch comprising:

an electric power source;

a display switch connected to said electric power source for supplying electric power during closure;

a light energy source connected to said electric power source through said display switch for producing light energy when said power is supplied;

an optical polarizer for polarizing the light energy from said light energy source;

an electro-optical ceramic for subjecting the light energy polarized by said optical polarizer to birefringence which is changed in accordance with the magnitude of an electric field, said electro-optical ceramic containing lead, lanthanum, zirconium and titanium, each having hysteresis by which the birefringence condition is stored after the removal of said electric field;

at least a pair of electrodes provided on the surface of said electro-optical ceramic and connected to said electric power source through said display switch for applying said electric field to said electro-optical ceramic;

an optical analyzer for analyzing the light energy subjected to birefringence by said electro-optical ceramic;

a sensor adapted to detect the condition of a motor vehicle; and a control unit connected between said electric power source and said electrodes and connected to said sensor for changing the magnitude of said electric field to a value which is enough to cause said electro-optical ceramic to store the birefringence condition when the motor vehicle condition detected by said sensor exceeds a predetermined abnormal limit, whereby the abnormality in the vehicle is indicated through the change in color display, said display switch being connected to the engine switch for displaying the stored birefringence condition upon activation of said engine switch.

2. A display apparatus according to claim 1, further comprising an alternating current voltage generator for generating an alternating current voltage, said voltage generator being connected to apply said voltage to said electrodes for erasing the birefringence condition stored in said electro-optical ceramic.

3. A display apparatus as set forth in claim 2, wherein said electrodes are spaced from each other by a constant distance, and wherein said control unit is adapted to change the level of said voltage in response to an output signal to change said birefringence.

4. A display apparatus as set forth in claim 2, wherein said at least a pair of electrodes includes at least three electrodes spaced from each other, and wherein said control unit is adapted to select two electrodes among said three electrodes in response to an output signal to thereby change the distance between said two electrodes to change said birefringence.

5. A display apparatus as set forth in claim 2, wherein said sensor includes at least an oil pressure switch and a brake lining wire detector, said sensor being connected to a voltage generator of said control unit for detecting an abnormal oil pressure and the wear of brake lining.

6. A display apparatus as in claim 2, wherein said analyzer comprises a polarizing plate oriented to differ from the orientation of the polarizer by 90° so that the light transmitted through said plate has a wavelength which varies in accordance with the birefringence of said ceramic.

* * * * *